(12) United States Patent
Turner et al.

(10) Patent No.: US 11,858,615 B2
(45) Date of Patent: Jan. 2, 2024

(54) ROTATING AIRFOIL ASSEMBLY WITH OPENING FORMED THEREIN TO EJECT OR TO DRAW AIR

(71) Applicant: General Electric Company, Schenectady, NY (US)

(72) Inventors: Kevin E. Turner, Liberty Township, OH (US); Suryarghya Chakrabarti, Mason, OH (US); Drew M. Capps, Avon, IN (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/647,561

(22) Filed: Jan. 10, 2022

(65) Prior Publication Data
US 2023/0219681 A1 Jul. 13, 2023

(51) Int. Cl.
| | | |
|---|---|---|
| *B64C 11/24* | (2006.01) | |
| *F01D 5/18* | (2006.01) | |
| *B64C 21/08* | (2023.01) | |
| *F02K 3/06* | (2006.01) | |

(52) U.S. Cl.
CPC .............. *B64C 11/24* (2013.01); *B64C 21/08* (2013.01); *F01D 5/18* (2013.01); *F01D 5/182* (2013.01); *F01D 5/183* (2013.01); *F02K 3/06* (2013.01); *F05D 2240/306* (2013.01)

(58) Field of Classification Search
CPC ......... B64C 11/16; B64C 11/18; B64C 11/24; B64C 27/32; B64C 27/46; B64C 27/463; B64C 27/467; B64C 2027/7227; B64C 2027/725; F01D 1/32; F03D 80/60
See application file for complete search history.

(56) References Cited

U.S. PATENT DOCUMENTS

| | | | |
|---|---|---|---|
| 1,653,217 A | 12/1927 | Koch | |
| 1,942,674 A * | 1/1934 | Whitsett | B64C 11/16 416/208 |
| 3,290,004 A | 12/1966 | Ishibashi | |

(Continued)

OTHER PUBLICATIONS

SKYbrary Aviation Safety "Lift", https://skybrary.aero/enhancing-safety/theory-flight, as viewed on Nov. 17, 2021.

(Continued)

*Primary Examiner* — Christopher R Legendre
(74) *Attorney, Agent, or Firm* — Venable LLP; David D. Leege; Michele V. Frank

(57) ABSTRACT

A rotating airfoil assembly including a rotation axis and a plurality of rotating airfoils configured to rotate about the rotation axis. Each rotating airfoil of the rotating airfoils includes a leading edge, a trailing edge, a suction surface between the leading edge and the trailing edge, and a pressure surface between the leading edge and the trailing edge. The suction surface and the pressure surface are positioned on opposite sides of the rotating airfoil such that, when airflows over the suction surface and the pressure surface of the rotating airfoil as the rotating airfoil rotates about the rotation axis, the rotating airfoil generates lift. At least one opening is located on one of the suction surface or the pressure surface. The at least one opening is configured to eject air or to draw air into the opening.

19 Claims, 11 Drawing Sheets

(56) References Cited

U.S. PATENT DOCUMENTS

| | | | | |
|---|---|---|---|---|
| 3,844,677 | A | * | 10/1974 | Evans ................... F01D 5/14 |
| | | | | 416/228 |
| 3,904,313 | A | * | 9/1975 | Bernaerts ............. B64C 27/325 |
| | | | | 416/20 R |
| 5,131,815 | A | | 7/1992 | Yamaguchi et al. |
| 6,004,095 | A | * | 12/1999 | Waitz ................... F04D 29/667 |
| | | | | 415/115 |
| 6,092,989 | A | | 7/2000 | Siga et al. |
| 8,016,561 | B2 | * | 9/2011 | Moniz ................... F01D 5/18 |
| | | | | 415/115 |
| 8,079,802 | B2 | | 12/2011 | Takamura et al. |
| 8,251,643 | B2 | | 8/2012 | Zheng et al. |
| 9,650,962 | B2 | * | 5/2017 | Karam ................... B64C 11/48 |
| 9,957,900 | B2 | | 5/2018 | Baladi et al. |
| 10,202,865 | B2 | * | 2/2019 | Breeze-Stringfellow ................... |
| | | | | F02K 3/025 |
| 10,370,086 | B2 | | 8/2019 | Vion et al. |
| 10,518,869 | B2 | * | 12/2019 | Foresto ................... F01D 5/18 |
| 10,584,594 | B2 | | 3/2020 | Neeli et al. |
| 2022/0340258 | A1 | * | 10/2022 | Pashias ................... B64C 11/24 |

OTHER PUBLICATIONS

Roddy Mc Namee, "Propeller Blade Asymmetric Loading Part 1", Sep. 29, 2010, available at https://www.youtube.com/watch?v=H88OhnwtAh0, as viewed on Dec. 29, 2021.

Roddy Mc Namee, "Propeller Blade Asymmetric Loading Part 2", Sep. 29, 2010, https://www.youtube.com/watch?v=H5SbZYFrJC8, as viewed on Dec. 29, 2021.

* cited by examiner

ROTATING AIRFOIL ASSEMBLY WITH OPENING FORMED THEREIN TO EJECT OR TO DRAW AIR

TECHNICAL FIELD

The present disclosure relates to a rotating airfoil assembly, particularly, a rotating airfoil assembly for an engine producing thrust for an aircraft, such as a fan or a propeller.

BACKGROUND

The thrust used to move an aircraft through the air may be produced by a plurality of airfoils rotating about a central axis, such as, for example, the fan blades of a fan for a unducted single fan engine or the propellers on a propeller driven aircraft. As the fan or the propeller rotates, some of the blades are traveling in a downward direction and others are traveling in an upward direction. When the aircraft is flying level, air flows into the fan or the propeller in an axial direction of the fan or the propeller, and the downward traveling blades and the upward traveling blades produce an equal amount of thrust. But, when the aircraft has an angle of attack, the air flows into the fan or the propeller with a non-axial component and the downward traveling blades produce a different amount of thrust than the upward traveling blades. For example, when the aircraft is pitched upward, such as during takeoff, the downward traveling blades produce a greater amount of thrust than the upward traveling blades, resulting in asymmetric loading of the fan blades or the propeller. Thus, in one rotation, the rotating airfoil (fan blade or propeller) is subjected to differential loads (a 1P load) resulting a cyclic loading condition for the rotating airfoil. Among other things, these cyclic loads can subject the rotating airfoil to fatigue stresses and strains.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

DETAILED DESCRIPTION

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and the scope of the present disclosure.

As noted above, a rotating airfoil, such as the fan blades of a fan for a turbofan engine or the propellers on a propeller driven aircraft, may be subjected to differential loading during rotation (1P loading) when the rotation axis, about which the rotating airfoil rotates, is angled (such as pitched upward or pitched downward) relative to the flow of air into the fan or the propeller. The embodiments discussed herein reduce the magnitude of the asymmetric load produced by the rotating airfoils during such conditions. In embodiments discussed herein, air is ejected from an outer surface of the rotating airfoil to disrupt the flow of air across this outer surface. In some embodiments, the air may be ejected on the suction side of rotating airfoils that are moving upward in a pitch up condition, reducing the amount of thrust produced by the blade during such conditions. In other embodiments, the air may be expelled on the pressure side of rotating airfoils that are moving downward in a pitch up condition, increasing the amount of thrust produced by the blade during such conditions.

Figure 1:
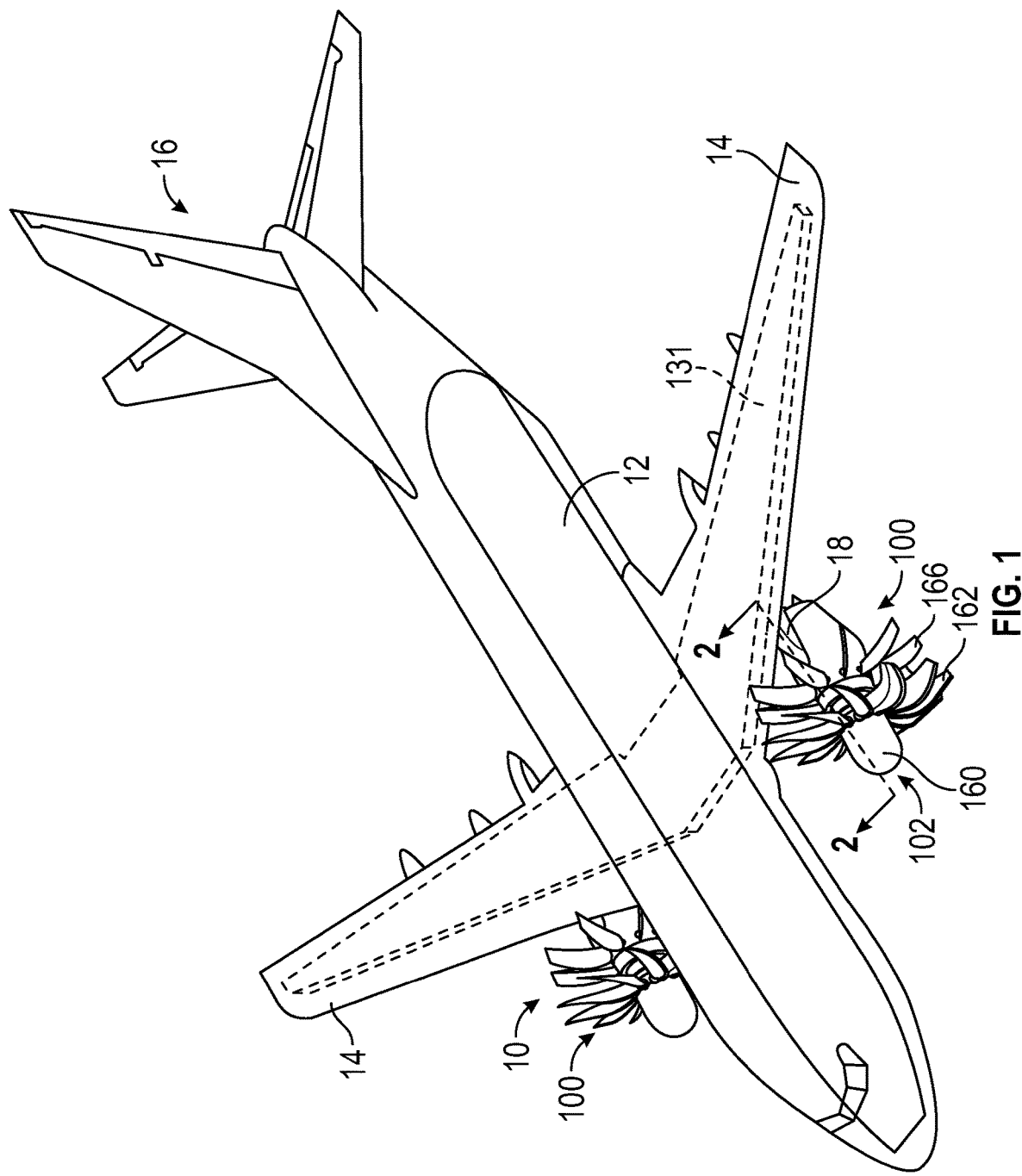
FIG. 1 is a schematic perspective view of an aircraft having unducted single fan engines with rotating airfoil assemblies according to an embodiment of the present disclosure.
Figure 3:
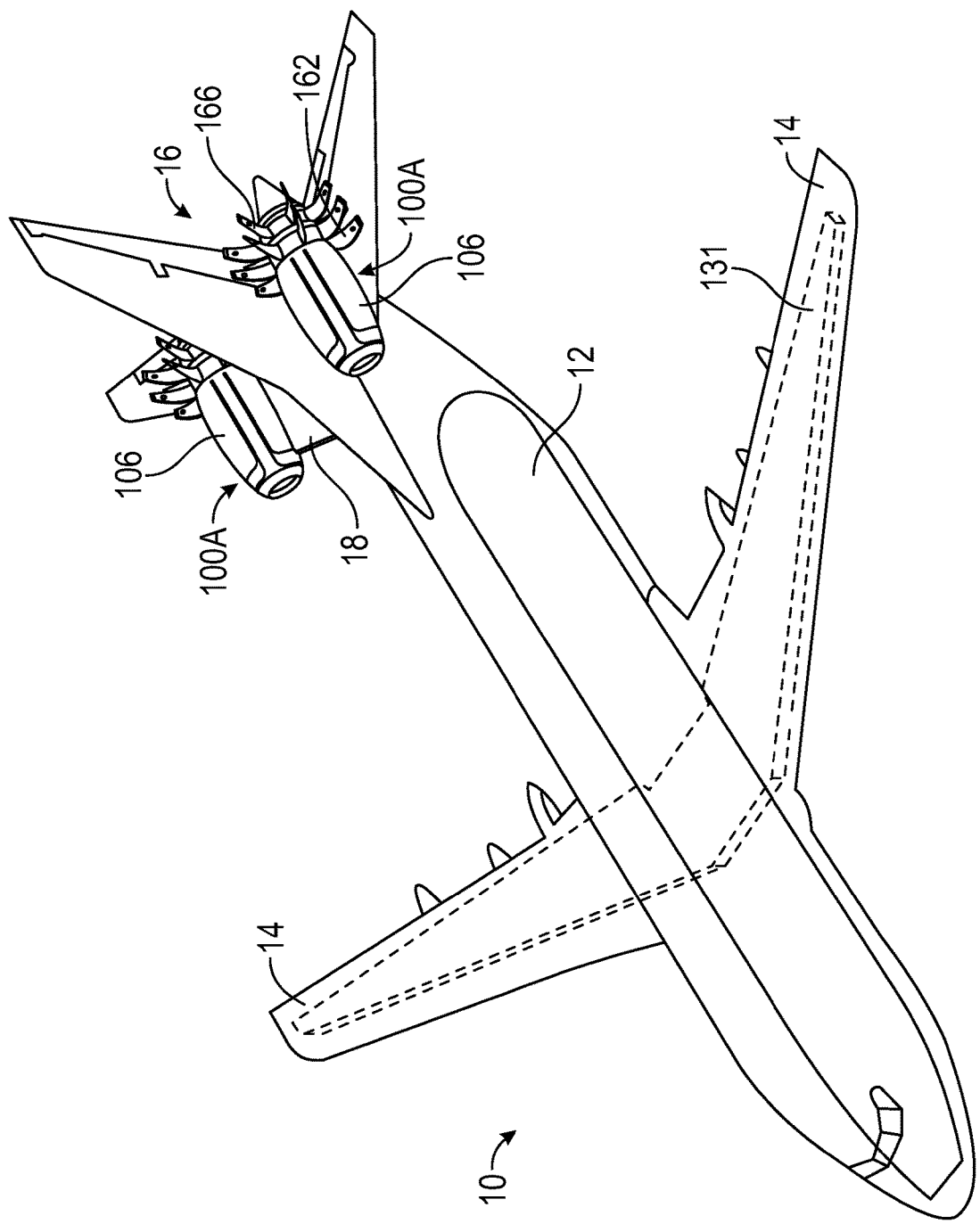
FIG. 3 is a schematic perspective view of an aircraft having other unducted single fan engines with rotating airfoil assemblies according to an embodiment of the present disclosure.

The rotating airfoils discussed herein are suitable for use with rotating airfoil assemblies used to produce thrust for fixed wing aircraft, and, in particular, for open rotor engines such as propellers or unducted fan engines. FIG. 1 is a perspective view of an aircraft 10 that may implement various preferred embodiments. The aircraft 10 includes a fuselage 12, a pair of wings 14 attached to the fuselage 12, and an empennage 16. The aircraft 10 also includes a propulsion system that produces a propulsive thrust required to propel the aircraft 10 in flight, during taxiing operations, and the like. The propulsion system for the aircraft 10 shown in FIG. 1 includes a pair of engines 100. In this embodiment, each engine 100 is attached to one of the wings 14 by a pylon 18 in an under-wing configuration. Although the engines 100 are shown attached to the wing 14 in an under-wing configuration in FIG. 1, in other embodiments, the engine 100 may have alternative configurations and be coupled to other portions of the aircraft 10. For example, the engine 100 may additionally or alternatively include one or more aspects coupled to other parts of the aircraft 10, such as, for example, the empennage 16 (as shown in FIG. 3), and the fuselage 12.

As will be described further below with reference to FIG. 2, the engines 100 shown in FIG. 1 are unducted single fan engines that are each capable of selectively generating a propulsive thrust for the aircraft 10. The amount of propulsive thrust may be controlled at least in part based on a volume of fuel provided to the unducted single fan engines via a fuel system 130 (see FIG. 2). An aviation turbine fuel in the embodiments discussed herein is a combustible hydrocarbon liquid fuel, such as a kerosene-type fuel, having a desired carbon number. The fuel is stored in a fuel tank 131 of the fuel system 130. As shown in FIG. 1, at least a portion of the fuel tank 131 is located in each wing 14 and a portion of the fuel tank 131 is located in the fuselage 12 between the wings 14. The fuel tank 131, however, may be located at other suitable locations in the fuselage 12 or the wing 14. The fuel tank 131 may also be located entirely within the fuselage 12 or the wing 14. The fuel tank 131 may also be separate tanks instead of a single, unitary body, such as, for example, two tanks each located within a corresponding wing 14.

Figure 2:
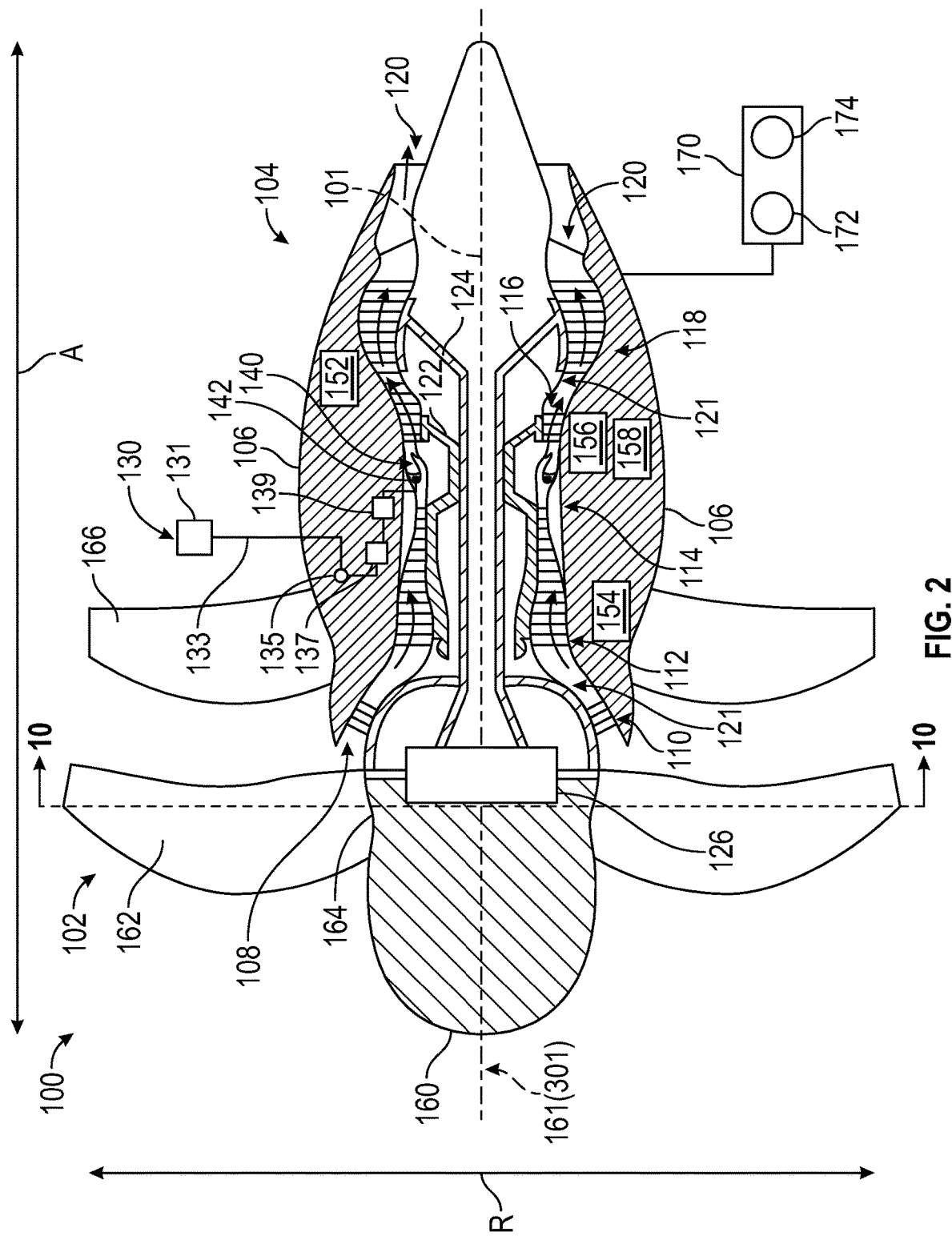
FIG. 2 is a schematic, cross-sectional view, taken along line 2-2 in FIG. 1, of one of the unducted single fan engines of the aircraft shown in FIG. 1.

FIG. 2 is a schematic, cross-sectional view of one of the engines 100 used in the propulsion system for the aircraft 10 shown in FIG. 1. The cross-sectional view of FIG. 2 is taken along line 2-2 in FIG. 1. As noted above, the engine 100 is an unducted single fan engine. The unducted single fan engine 100 has an axial direction A (extending parallel to a longitudinal centerline 101, shown for reference in FIG. 2), a radial direction R, and a circumferential direction. The circumferential direction (not depicted in FIG. 2) extends in a direction rotating about the longitudinal centerline 101. The unducted single fan engine 100 includes a fan section 102 and a turbomachine 104 disposed downstream from the fan section 102.

The turbomachine 104 depicted in FIG. 2 includes a tubular outer casing 106 (also referred to as a housing or nacelle) that defines an inlet 108. In this embodiment, the inlet 108 is annular. The outer casing 106 encases an engine core that includes, in a serial flow relationship, a compressor section including a booster or a low-pressure (LP) compressor 110 and a high-pressure (HP) compressor 112, a combustion section 114, a turbine section including a high-pressure (HP) turbine 116 and a low-pressure (LP) turbine 118, and a jet exhaust nozzle section 120. The compressor section, the combustion section 114, and the turbine section together define at least in part a core air flowpath 121 extending from the inlet 108 to the jet exhaust nozzle section 120. The turbomachine 104 further includes one or more drive shafts. More specifically, the turbomachine 104 includes a high-pressure (HP) shaft or spool 122 drivingly connecting the HP turbine 116 to the HP compressor 112, and a low-pressure (LP) shaft or spool 124 drivingly connecting the LP turbine 118 to the LP compressor 110.

The unducted single fan engine 100, more specifically, the turbomachine 104, is operable with the fuel system 130 and receives a flow of fuel from the fuel system 130. The fuel system 130 includes a fuel delivery assembly 133 providing the fuel flow from the fuel tank 131 to the unducted single fan engine 100, and, more specifically, to a plurality of fuel nozzles 142 that inject fuel into a combustion chamber of a combustor 140 (see FIG. 3, discussed further below) of the combustion section 114. The fuel delivery assembly 133 includes tubes, pipes, conduits, and the like, to fluidly connect the various components of the fuel system 130 to the unducted single fan engine 100. The fuel tank 131 is configured to store the hydrocarbon fuel, and the hydrocarbon fuel is supplied from the fuel tank 131 to the fuel delivery assembly 133. The fuel delivery assembly 133 is configured to carry the hydrocarbon fuel between the fuel tank 131 and the unducted single fan engine 100 and, thus, provides a flow path (fluid pathway) of the hydrocarbon fuel from the fuel tank 131 to the unducted single fan engine 100.

The fuel system 130 includes at least one fuel pump fluidly connected to the fuel delivery assembly 133 to induce the flow of the fuel through the fuel delivery assembly 133 to the unducted single fan engine 100. One such pump is a main fuel pump 135. The main fuel pump 135 is a high-pressure pump that is the primary source of pressure rise in the fuel delivery assembly 133 between the fuel tank 131 and the unducted single fan engine 100. The main fuel pump 135 may be configured to increase a pressure in the fuel delivery assembly 133 to a pressure greater than a pressure within the combustion chamber of the combustor 140.

The fuel system 130 also includes a fuel metering unit 137 in fluid communication with the fuel delivery assembly 133. Any metering unit 137 may be used including, for example, a metering valve. The metering unit 137 is positioned downstream of the main fuel pump 135 and upstream of a fuel manifold 139 configured to distribute fuel to the fuel nozzles 142. The fuel system 130 is configured to provide the fuel to metering unit 137, and the metering unit 137 is configured to receive fuel from the fuel tank 131. The metering unit 137 is further configured to provide a flow of fuel to the unducted single fan engine 100 in a desired manner. More specifically, the metering unit 137 is configured to meter the fuel and to provide a desired volume of fuel, at, for example, a desired flow rate, to the fuel manifold 139 of the unducted single fan engine 100. The fuel manifold 139 is fluidly connected to the fuel nozzles 142 and distributes (provides) the fuel received to the plurality of fuel nozzles 142, where the fuel is injected into the combustion chamber and combusted. Adjusting the fuel metering unit 137 changes the volume of fuel provided to the combustion chamber and, thus, changes the amount of propulsive thrust produced by the unducted single fan engine 100 to propel the aircraft 10.

The unducted single fan engine 100 also includes various accessory systems to aid in the operation of the unducted single fan engine 100 and/or an aircraft 10. For example, the unducted single fan engine 100 may include a main lubrication system 152, a compressor cooling air (CCA) system 154, an active thermal clearance control (ATCC) system 156, and a generator lubrication system 158, each of which is depicted schematically in FIG. 2. The main lubrication system 152 is configured to provide a lubricant to, for example, various bearings and gear meshes in the compressor section, the turbine section, the HP spool 122, and the LP shaft 124. The lubricant provided by the main lubrication system 152 may increase the useful life of such components and may remove a certain amount of heat from such components through the use of one or more heat exchangers. The compressor cooling air (CCA) system 154 provides air from one or both of the HP compressor 112 or the LP compressor 110 to one or both of the HP turbine 116 or the LP turbine 118. The active thermal clearance control (ATCC) system 156 acts to minimize a clearance between tips of turbine blades and casing walls as casing temperatures vary during a flight mission. The generator lubrication system 158 provides lubrication to an electronic generator (not shown), as well as cooling/heat removal for the electronic generator. The electronic generator may provide electrical power to, for example, a startup electrical motor for the unducted single fan engine 100 and/or various other electronic components of the unducted single fan engine 100 and/or an aircraft 10. The lubrication systems for the unducted single fan engine 100 (e.g., the main lubrication system 152 and the generator lubrication system 158) may use hydrocarbon fluids, such as oil, for lubrication, in which the oil circulates through inner surfaces of oil scavenge lines.

The fan section 102 of the unducted single fan engine 100 includes a spinner 160. A plurality of fan blades 162 are coupled to the spinner 160. More specifically, the spinner 160 includes a fan hub 164, and the fan blades 162 are coupled to the fan hub 164 (or disk). The fan blades 162 and the fan hub 164 are rotatable, together, circumferentially about a rotation axis 161, which, in this embodiment, is coincident with the longitudinal centerline (axis) 101. The spinner 160 rotates with respect to outer casing 106. Each of the fan blades 162 is an airfoils and, more specifically, rotating airfoils. The fan blades 162, together with the fan hub 164, in this embodiment, comprise a rotating airfoil assembly.

The turbomachine 104 of this embodiment is a torque producing system that generates torque to rotate the fan blades 162. The turbomachine 104 is configured to operate (e.g., to rotate) the spinner 160. The spinner 160 may be coupled to a shaft, and, more specifically, the LP shaft 124, of the turbomachine 104, and the LP shaft 124 rotates the fan blades 162 and the fan hub 164. In some embodiments, the LP shaft 124 may be coupled to the spinner 160 in a direct drive configuration, but, in this embodiment, the LP shaft 124 is coupled to a gearbox 126 that, in turn, transmits a rotational (torsional) force to rotate the spinner 160.

Coupled to the outer casing 106 may be one or more outlet guide vanes 166. In this embodiment, the outlet guide vanes 166 are positioned aft of the fan blades 162. In this embodiment, the outer casing 106 is stationary such that the one or more outlet guide vanes 166 do not rotate around the longitudinal centerline 101 and are, thus, stationary with respect to rotation about the longitudinal centerline 101. Although the outlet guide vanes 166 are stationary with respect to the longitudinal centerline 101, the outlet guide vanes 166 are capable of being rotated or moved with respect to the outer casing 106.

During operation of the unducted single fan engine 100, air flows from the left side of FIG. 2 toward the right side of FIG. 2. A portion of the air flow may flow past the fan blades 162 and the outlet guide vanes 166. A portion of the air flow may enter the outer casing 106 through the annular inlet 108 as the air flowing through core air flowpath 121 to be mixed with the fuel for combustion in the combustor 140 and exit through the jet exhaust nozzle section 120. As noted above, the outlet guide vanes 166 may be movable with respect to the outer casing 106 to guide the air flow in a particular direction. Each outlet guide vane 166 may be movable to adjust the lean, pitch, sweep, or any combination thereof, of the outlet guide vane 166.

FIG. 3 shows a schematic view of the aircraft 10 with an unducted single fan engine 100A with another configuration for an unducted single fan (USF) engine. In the embodiment shown in FIGS. 1 and 2, a forward end or a front portion of the outer casing 106 includes the one or more fan blades 162 and the one or more outlet guide vanes 166. In other embodiments, the one or more fan blades 162 and the one or more outlet guide vanes 166 may have a different arrangement with respect to the outer casing 106. For example, in the embodiment shown in FIG. 3, the one or more fan blades 162 and the one or more outlet guide vanes 166 may be located on an aft end or a rear portion of the outer casing 106, such as coupled to a rear portion of the outer casing 106. The unducted single fan engine 100A may include all of the features of FIGS. 1 and 2 and may have similar components and operation of the unducted single fan engine 100 of FIGS. 1 and 2. However, in FIG. 3, the one or more fan blades 162 and the one or more outlet guide vanes 166 are located on an aft end or a rear portion of the outer casing 106. More specifically, the one or more fan blades 162 and the one or more outlet guide vanes 166 may be coupled to a rear portion of the outer casing 106.

In other embodiments, an engine according to the disclosure may be configured to have stationary vanes positioned forward of the rotating fan blades 162 (thus, the vanes 166 are inlet guide vanes). Although the outlet guide vanes 166 may be stationary and not rotate about the longitudinal centerline 101, as described above, the one or more outlet guide vanes 166 may rotate counter to the one or more fan blades 162 such that the one or more outlet guide vanes 166 are contra-rotating rotors in a contra-rotating open rotor (CROR) engine. Either pusher configurations, where the rotors are forward of the pylon 18, or puller configurations, where the rotors are aft the pylon 18 are contemplated. In such a case, the contra-rotating rotors may also be rotating airfoils that are part of a rotating airfoil assembly, as discussed further below.

Figure 4:
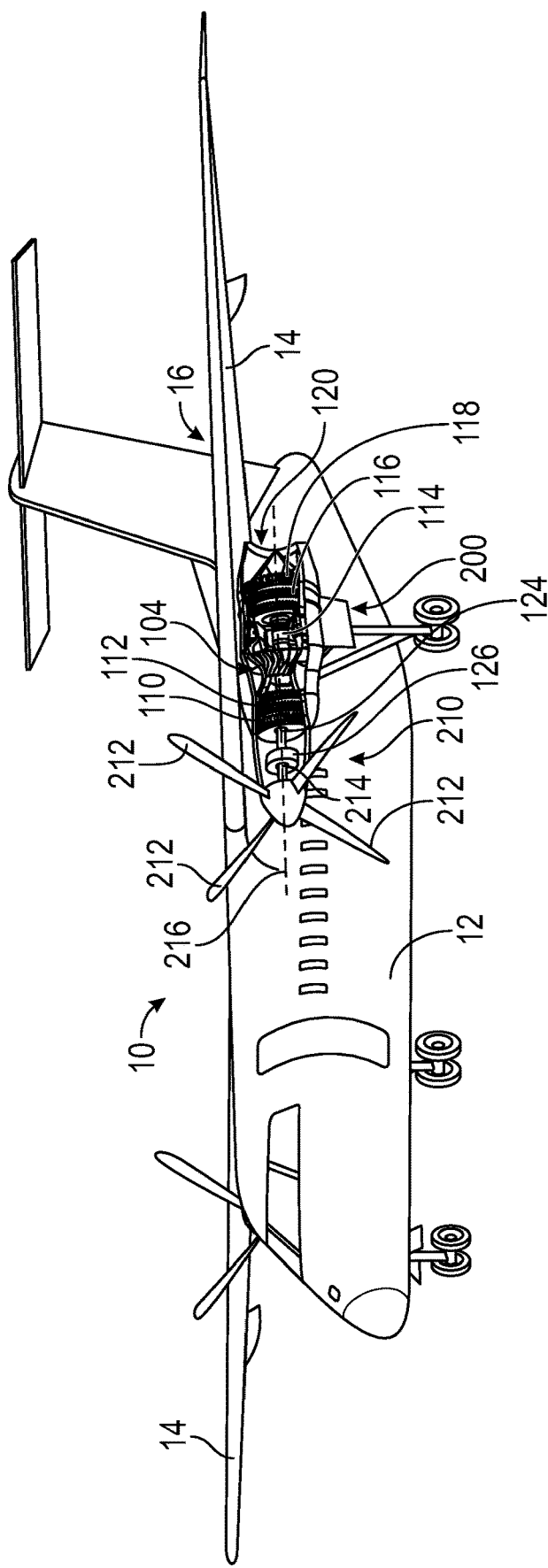
FIG. 4 is a schematic perspective view of an aircraft having turboprop engines with rotating airfoil assemblies according to an embodiment of the present disclosure.

FIG. 4 is a schematic perspective view of a propeller driven aircraft 10. In this embodiment, the aircraft 10 is driven by turboprop engines 200. Each turboprop engine 200 of this embodiment includes a turbomachine 104 and a propeller assembly 210. The propeller assembly 210 includes a plurality of propeller blades 212 that are coupled to and extend outwardly from a propeller shaft 214 in the radial direction R. The turbomachine 104 is a torque producing system for the propeller assembly 210. The turbomachine 104 of the turboprop engine 200 is similar to the turbomachine 104 discussed above and a detailed description of those components are omitted here, as the discussion above also applies to the turboprop engine 200. The turbomachine 104 is configured to operate (e.g., to rotate) the propeller assembly 210 and, more specifically, the propeller shaft 214 about a rotation axis 216 of the propeller shaft 214. In this embodiment, the rotation axis 216 is coincident with the longitudinal centerline 101 of the turbomachine 104, but, in other embodiments, the rotation axis 216 may be parallel to the longitudinal centerline 101. Although the propeller shaft 214 may be directly coupled to the turbomachine 104, such as the LP shaft 124, in a direct drive configuration, the turbomachine 104, and, more specifically, the LP shaft 124 is coupled to a gearbox 126 that, in turn, transmits a rotational (torsional) force to rotate the propeller shaft 214. The propeller blades 212 are airfoils, more specifically, rotating airfoils, and the propeller assembly 210 is another example of a rotating airfoil assembly. The propeller assembly 210 is an open rotor system that may also experience asymmetric loading on the propeller blades 212 with the longitudinal centerline 101 of the turboprop engine 200 being angled (such as pitched upward or downward) relative to the flow of air into the propeller assembly 210.

Figure 5:
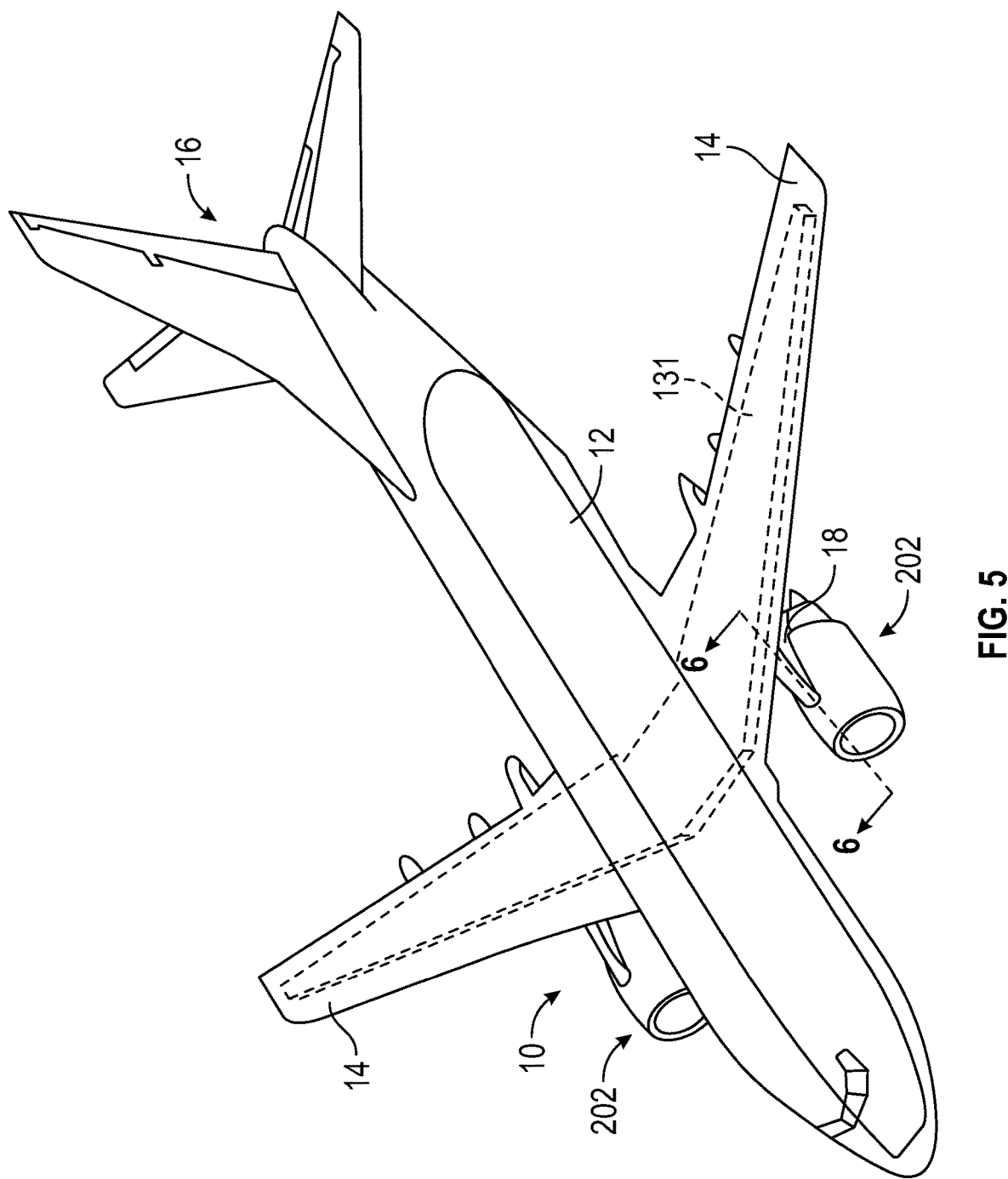
FIG. 5 is a schematic perspective view of an aircraft having ducted turbofan engines with rotating airfoil assemblies according to an embodiment of the present disclosure.
Figure 6:
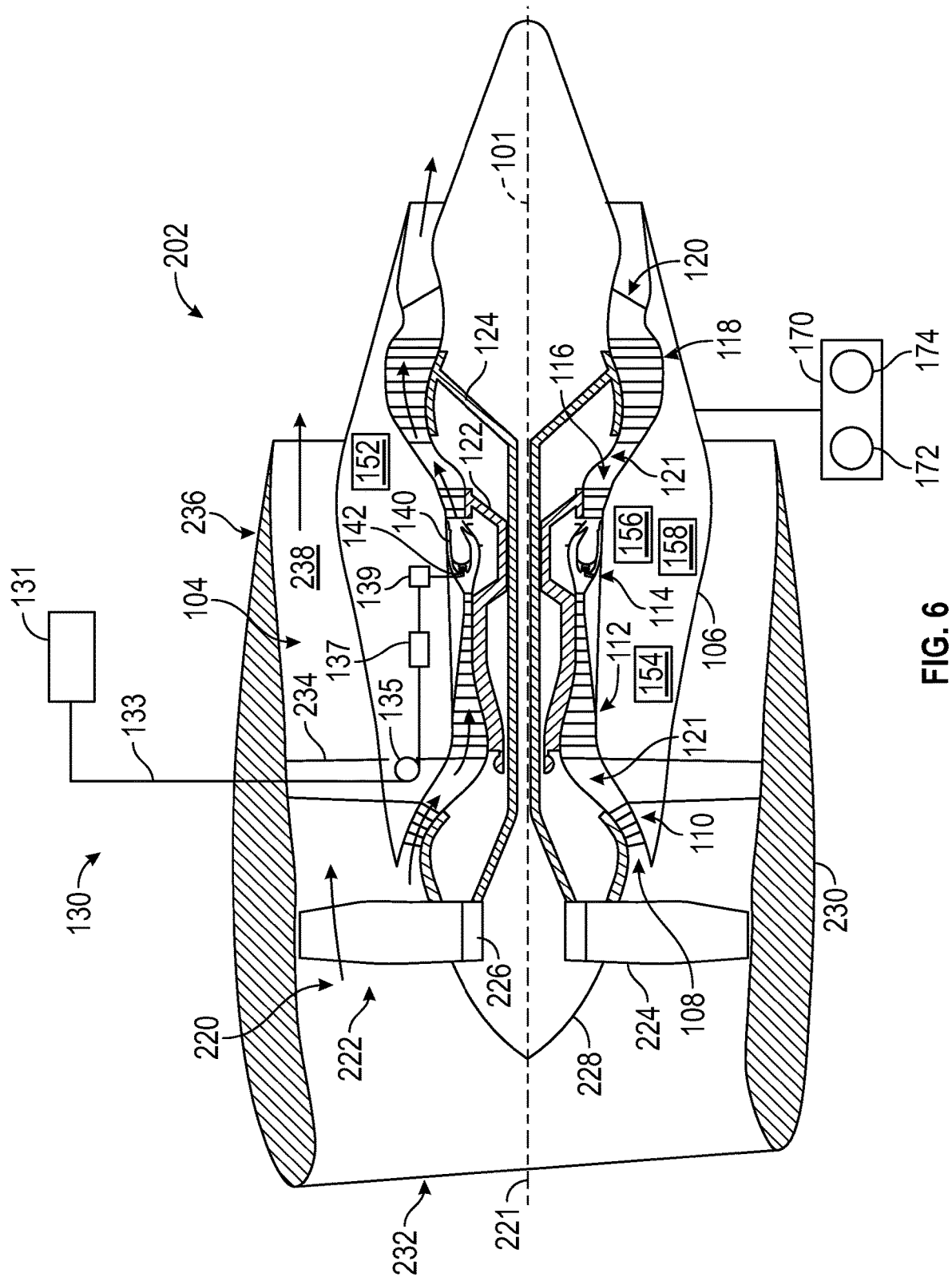
FIG. 6 is a schematic, cross-sectional view, taken along line 6-6 in FIG. 5, of one of the ducted turbofan engines of the aircraft shown in FIG. 6.

FIG. 5 is a perspective view of an aircraft 10 that is driven by turbofan engines 202. FIG. 6 is a schematic, cross-sectional view of one of the turbofan engines 202 used in the propulsion system for the aircraft 10 shown in FIG. 5. The cross-sectional view of FIG. 6 is taken along line 6-6 in FIG.

5. For the embodiment depicted in FIGS. 5 and 6, the turbofan engine 202 is a high bypass turbofan engine. The turbofan engine 202 includes a fan section 220 and a turbomachine 104 disposed downstream from the fan section 220. The turbomachine 104 of the turbofan engine 202 is similar to the turbomachine 104 discussed above and a detailed description of those components are omitted here, as the discussion above also applies to the turbofan engine 202.

The fan section 220 shown in FIG. 6 includes a fan 222 having a plurality of fan blades 224 coupled to a disk 226. The fan blades 224 and the disk 226 are rotatable, together, about a rotation axis 221, which, in this embodiment, is coincident with the longitudinal centerline (axis) 101. The LP shaft 124 is connected to the disk 226 to rotate the fan blades 224 and the disk 226. The disk 226 is covered by a rotatable front hub 228 aerodynamically contoured to promote an airflow through the plurality of fan blades 224. Further, an annular fan casing or outer nacelle 230 is provided, circumferentially surrounding the fan 222 and/or at least a portion of the turbomachine 104. The outer nacelle 230 is annular and defines an inlet 232 of the fan section 220. Although the outer nacelle 230 may be symmetrical, the outer nacelle 230 and the inlet 232 may be asymmetrical, such as having asymmetry between the top and the bottom, and asymmetry between the left and the right. The outer nacelle 230 is supported relative to the turbomachine 104 by a plurality of circumferentially spaced outlet guide vanes 234. A downstream section 236 of the outer nacelle 230 extends over an outer portion of the turbomachine 104 so as to define a bypass airflow passage 238 therebetween. The fan blades 224 are airfoils, more specifically, rotating airfoils, and the fan 222 is another example of a rotating airfoil assembly.

Air flows from the left side of FIG. 6 toward the right side of FIG. 6. A portion of the air flow may flow past the fan blades 224 and the outlet guide vanes 234 through the bypass airflow passage 238. A portion of the air flow may enter the outer casing 106 through the annular inlet 108 as the air flowing through core air flowpath 121 to be mixed with the fuel for combustion in the combustor 140 and exit through the jet exhaust nozzle section 120, as discussed above. The outer nacelle 230 helps to direct the flow of air into the fan blades 224 of the fan 222, even when the turbofan engine 202 and the aircraft 10 is pitched upward or downward. The fan 222 of the turbofan engine 202 is, thus, not subjected to as significant of asymmetrical loading conditions when the longitudinal centerline 101, about which the fan 222 is rotating, is angled (such as pitched upward or downward) relative to the flow of air into the inlet 232 of the fan section 220, as are the open rotor rotating airfoil assemblies discussed above. Nevertheless, the rotating airfoils and rotating airfoil assemblies may also be used as the fan 222 of the turbofan engine 202.

Each of the torque producing systems discussed above for the engines 100, 100A, 200, 202 shown in FIGS. 1 to 6 is turbomachine 104. Other suitable torque producing systems, however, may be used to rotate the rotating airfoils (e.g., fan blades 162, 222 and propeller blades 212) and rotating airfoil assemblies (e.g., spinner 160, propeller assembly 210, and fan 222). Other suitable torque producing systems include other engines, such as reciprocating engines, for example. Although the aircraft 10 shown in FIGS. 1, 3, 4, and 5 is an airplane, the embodiments described herein may also be applicable to other aircraft 10, including, for example, other fixed-wing unmanned aerial vehicles (UAV). Further, although not depicted herein, in other embodiments, the embodiments discussed herein may be applicable to any rotating airfoils and rotating airfoil assemblies, such as, for example the blades of wind turbines.

Figure 7:
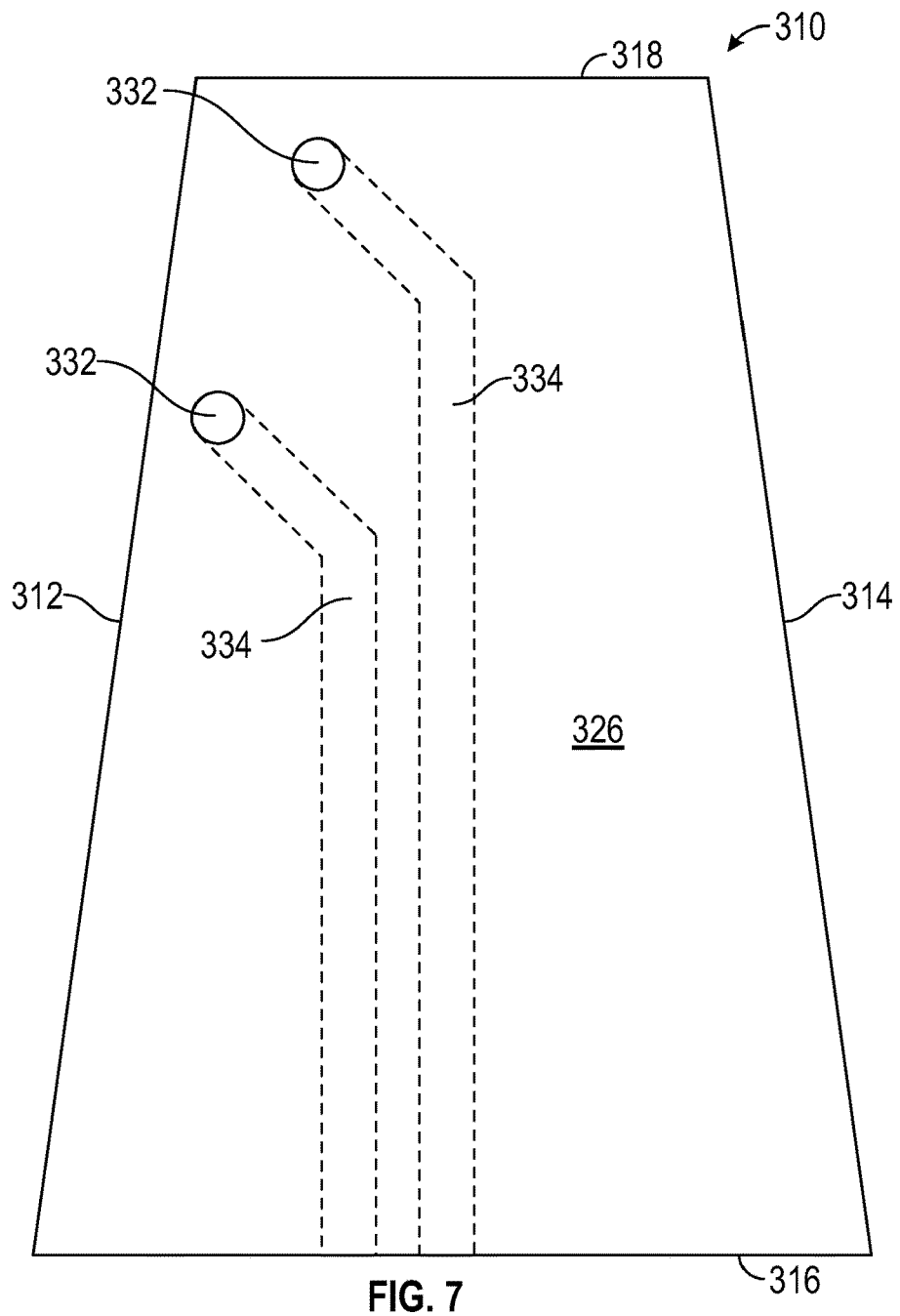
FIG. 7 is a side view of a rotating airfoil according to an embodiment of the present disclosure.
Figure 8:
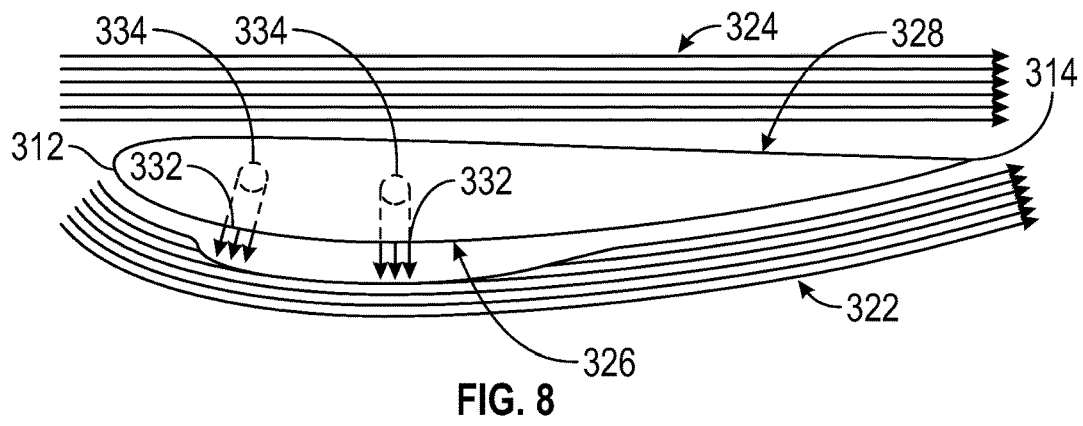
FIG. 8 is a top view of the rotating airfoil shown in FIG. 7.

FIGS. 7 and 8 show a rotating airfoil 310 that may be used in an airfoil assembly 300 (see, e.g., FIG. 10), such as the spinner 160, propeller assembly 210, and fan 222, discussed above. FIG. 7 is a side view of the rotating airfoil 310, and FIG. 8 is a top view of the rotating airfoil 310. The rotating airfoil 310 includes a leading edge 312, a trailing edge 314, a root 316, and a tip 318. The rotating airfoil 310 is connected on the root end of the rotating airfoil 310 to a central support, such as the fan hub 164, the propeller shaft 214, or the disk 226, about which the rotating airfoil 310 rotates. The rotating airfoil 310 extends outwardly in a radial direction R (FIG. 2) of the rotating airfoil assembly 300 from the root 316 to the tip 318. The rotating airfoil 310 includes a suction side 322 and a pressure side 324, and surfaces of the rotating airfoil 310 are formed on each of the suction side 322 and the pressure side 324 between the leading edge 312 and the trailing edge 314. These surfaces are a suction surface 326 and a pressure surface 328. As can be seen in FIG. 8, the rotating airfoil 310 is a cambered airfoil with the suction surface 326 having a convex curvature and the pressure surface 328 being generally flat. The rotating airfoil 310 may have any suitable shape, however, including, for example, concave surfaces, and the rotating airfoil 310 may be a symmetric airfoil. The suction surface 326 and the pressure surface 328 are positioned on opposite sides of the rotating airfoil 310 such that, when airflows over the suction surface 326 and the pressure surface 328 of the rotating airfoil 310 as the rotating airfoil 310 rotates about a rotation axis 301, the rotating airfoil 310 generates lift (thrust).

The rotating airfoil 310 includes at least one opening 332 formed in one of the suction surface 326 or the pressure surface 328. In this embodiment, the rotating airfoil 310 includes a plurality of openings 332. As shown in FIG. 7, two openings 332 are located on the suction surface 326. Each opening 332 is fluidly connected to an air source, such as by a conduit 334 formed in the rotating airfoil 310, as shown in FIG. 8. Each opening 332 is configured to eject air from the air source in an outward direction from the suction surface 326 as ejected air. Contour lines depict the flow of air over the suction surface 326 and the pressure surface 328. When air is ejected from the openings 332, the ejected air disrupts the follow of air over the surface. As depicted in FIG. 8, for example, the ejected air disrupts the flow of air over the suction surface 326, and, more specifically, disturbs the boundary layer, reducing the lift produced by the rotating airfoil 310. Instead of being ejected from the openings 332, air can also be drawn into the openings 332. With the openings 332 being positioned on the suction surface 326, as shown in FIG. 8, drawing the air into the openings 332 could have the opposite effect as ejecting the air and increases the lift produced by the rotating airfoil 310.

The opening 332 includes edges, and the edges define a plane of the opening 332. These edges and, thus, the opening 332 may have any suitable shape in the surface one which they are formed (e.g., suction surface 326 in FIG. 7). In FIG. 7, the opening is shown as a circular opening. Other suitable shapes include, for example, elliptical openings, parabolic openings, rectangular openings, and triangular openings. In addition, the openings 332 may have various suitable shapes into the rotating airfoil 310 (a direction normal to the plane of the opening 332). This passage connecting the opening 332 with the conduit 334 may be cylindrical or conical, for example. In addition, the opening 332 may have a wide range of suitable sizes. The opening 332 may be relatively large, having an area of, for example, two centimeters squared, or relatively small, having an area of, for example, six microns squared. When a plurality of relatively small openings 332 are used, the plurality of openings 332 may be arrayed on the surface (such as the suction surface 326) of the rotating airfoil 310.

Figure 9A:
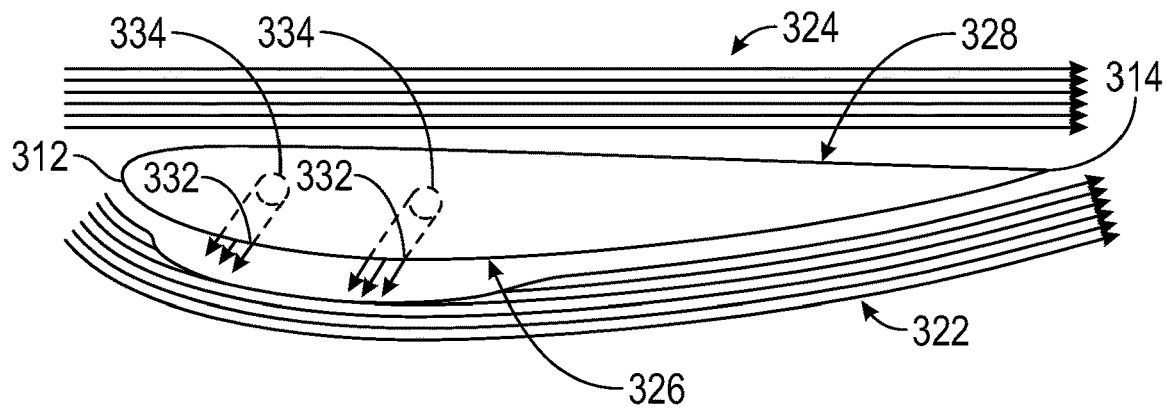
FIGS. 9A, 9B, and 9C are top views of the rotating airfoil with each having alternative orientations and positions of openings in the airfoil.
Figure 9B:
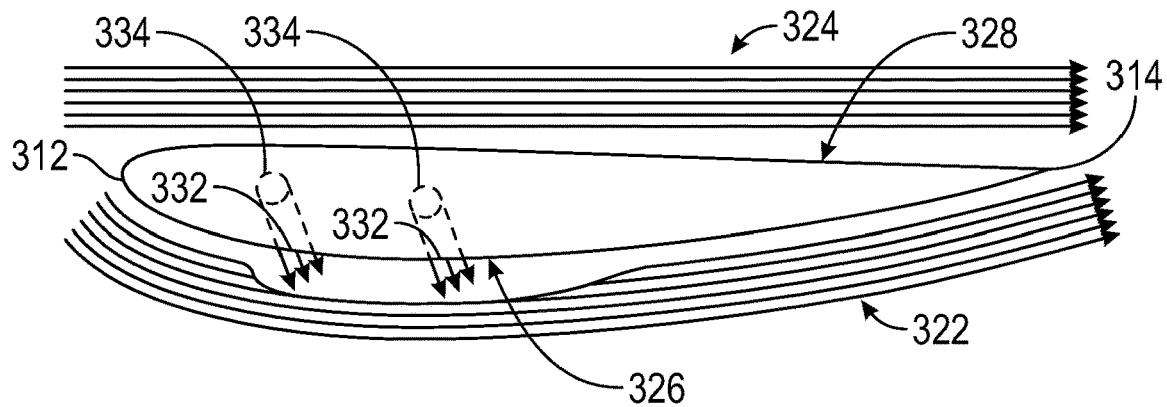
Figure 9C:
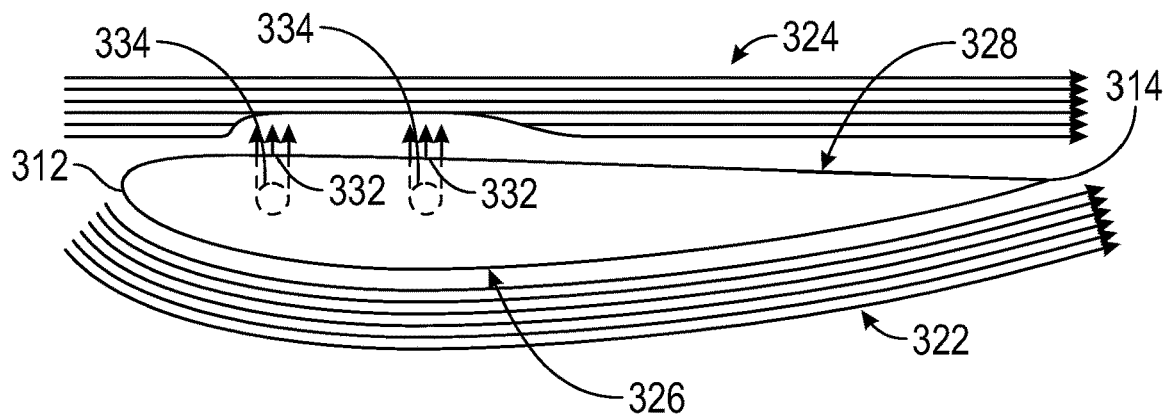

In the embodiment shown in FIG. 8, the ejected air is ejected directly outward in a direction that is normal to the plane of the opening 332. The ejected air may be directed at other directions instead of directly outward. FIGS. 9A and 9B are top views of the rotating airfoil 310 with each having alternative orientations of the opening 332. The opening 332 shown in FIG. 9A is configured to eject air (the ejected air) both outward and in a direction toward the leading edge 312. This is a direction that opposed the direction of the boundary layer flow across the suction surface 326. The opening 332 shown in FIG. 9B is configured to eject air (the ejected air) both outward and in a direction toward the trailing edge 314. This is a direction that is with the direction of the boundary layer flow across the suction surface 326. In the examples discussed above, the openings 332 are shown as being formed on the suction surface 326, but openings 332 can be formed on the pressure surface 328 instead of the suction surface 326, as shown in FIG. 9C. FIG. 9C is a top view of the rotating airfoil 310 with openings 332 formed on the pressure surface 328. With the openings 332 being positioned on the pressure surface 328, as shown in FIG. 9C, ejecting air from the openings 332 increases the lift produced by the rotating airfoil 310, and drawing the air into the openings 332 decreases the lift produced by the rotating airfoil 310.

The openings 332 may be formed anywhere on either the suction surface 326 or pressure surface 328. In some embodiments, such as shown in FIG. 7, the openings 332 are formed closer to the tip 318 than the root 316 and may be formed on the outer half of the rotating airfoil 310 in the radial direction R. The openings 332 may also be formed closer to the leading edge 312 than the trailing edge 314, such as on the leading half of the suction surface 326 or pressure surface 328.

Figure 10:
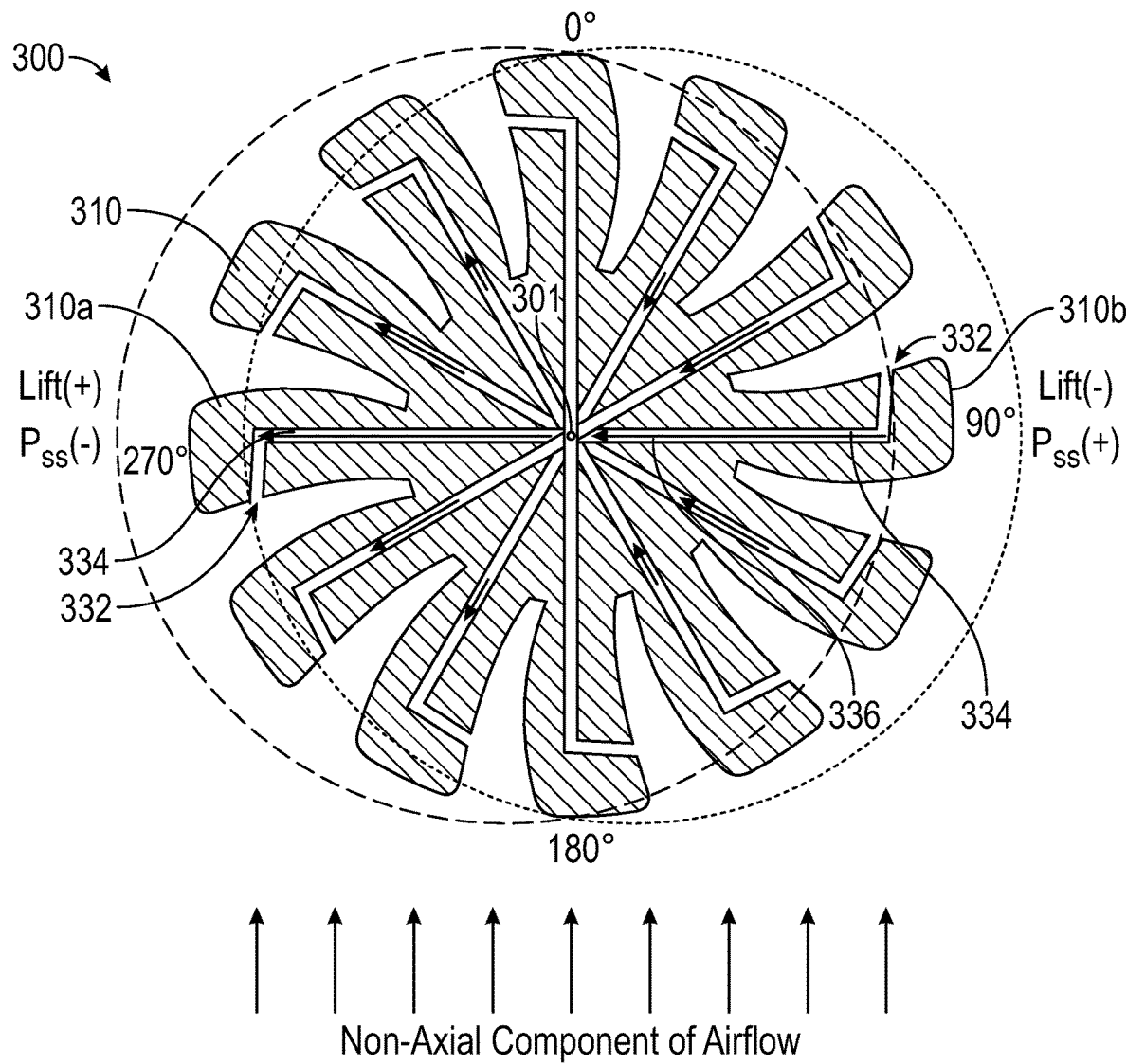
FIG. 10 is a schematic, cross-sectional view, taken along line 10-10 in FIG. 2, of a fan (rotating airfoil assembly) of the unducted single fan engines of the aircraft shown in FIG. 2.

FIG. 10 shows a rotating airfoil assembly 300 including the rotating airfoil 310 according to an embodiment. The rotating airfoil assembly 300 depicted in FIG. 10 is the spinner 160 of the unducted single fan engine 100 of FIG. 2, and FIG. 10 is a schematic, cross-sectional view, taken along line 10-10 in FIG. 2. The rotating airfoils 310 (fan blades 162) of the rotating airfoil assembly 300 are rotating in a clockwise direction in FIG. 10 about a rotation axis 301 (rotation axis 161). To aid in the following discussion, angular positions of the rotating airfoil 310 and the rotating airfoil assembly 300 are given relative to the rotation axis 301 as shown in FIG. 10. The rotating airfoil 310 is, thus, rotating in a downward direction from zero degrees to one-hundred eighty degrees and in an upward direction from one-hundred eighty degrees to three hundred sixty degrees (zero degrees).

FIG. 10 illustrates the rotation axis 301 being angled (such as pitched upward or downward) relative to the flow of air into the rotating airfoil 310. More specifically, in FIG. 10, the rotation axis 301 is angled upward relative to the flow of air into the rotating airfoil 310 such as when the aircraft 10 (and also the longitudinal centerline 101 of the unducted single fan engine 100) is pitched upward during takeoff or climb. In such a condition, the rotating airfoil assembly 300 is subjected to a non-axial component of airflow that is in an upward direction. Each rotating airfoil 310 produces a similar amount of lift at the top (zero degrees) and bottom (one hundred eighty degrees) of the rotation that the rotating airfoil 310 would produce if the rotating airfoil assembly 300 was not inclined. Each rotating airfoil 310, however, produces less lift when moving downward from the top (zero degrees) to the bottom (one hundred eighty degrees) and more lift when moving upward from the bottom (one hundred eighty degrees) to the top (zero degrees). This change in lift is schematically illustrated by the larger of the broken lines in FIG. 10. The lowest amount of lift produced by a rotating airfoil 310 as the rotating airfoil 310 makes one rotation is at ninety degrees, steadily increasing from that point to two hundred seventy degrees before steadily decreasing as the rotating airfoil 310 continues rotating. This may be referred to as 1P loading.

The change in lift for one rotation (1P) can result in the rotating airfoil 310 undergoing cyclic stresses. The rotating airfoil 310 needs to be designed with these cyclic stresses in mind to avoid fatigue of the rotating airfoil 310. In the embodiments discussed herein, the openings 332 may be used to mitigate the magnitude of the difference in lift or even eliminate the difference in lift altogether. In the condition illustrated in FIG. 10, air may be selectively ejected from openings 332 formed on one of the suction surface 326 (the configuration shown in FIG. 8) or the pressure surface 328 (the configuration shown in FIG. 9C) of each rotating airfoil 310 to disrupt the airflow over the suction surface 326 or the pressure surface 328. For example, the openings 332 may be formed on the suction surface 326 and air may be ejected as the rotating airfoil 310 travels upward from the bottom (one hundred eighty degrees) to the top (zero degrees), reducing the lift as the rotating airfoil 310 travels upward and the magnitude of the cyclic loading on the rotating airfoil 310. The amount of ejected air from each of the openings 332 may be varied as the rotating airfoil 310 rotates upward. As noted above, the greatest lift is produced when the rotating airfoil 310 is located at the two-hundred-seventy-degree position and, thus, the amount of air ejected from the openings 332 may be increased from the bottom (one hundred eighty degrees) to two hundred seventy degrees and, then, decreased from two hundred seventy degrees to the top (zero degrees). In FIG. 10, the change in amount of air ejected is illustrated by the length of the arrows in the conduit 334.

Conversely, the openings 332 may be formed on the pressure surface 328 and air may be ejected as the rotating airfoil 310 travels downward from the top (zero degrees) to the bottom (one hundred eighty degrees), increasing the lift as the rotating airfoil 310 travels downward, but reducing the magnitude of the cyclic loading on the rotating airfoil 310. As noted above, the least amount of lift is produced when the rotating airfoil 310 is located at the ninety-degree position and, thus, the amount of air ejected from the openings 332 may be increased from the top (zero degrees) to ninety degrees and then, decreased from ninety degrees to the bottom (one hundred eighty degrees).

In the embodiment shown in FIG. 10, selectively ejecting the air from the openings 332 is accomplished passively without the use of valves, controllers, and the like. In this embodiment, each rotating airfoil 310 is part of a corresponding pair of rotating airfoils 310. A first rotating airfoil 310a is positioned opposite to a second rotating airfoil 310b with the rotation axis 301 therebetween. More specifically, the first rotating airfoil 310a and the second rotating airfoil 310b are one hundred eighty degrees apart from each other such that the first rotating airfoil 310a is positioned directly opposite to the second rotating airfoil 310b. Together, the first rotating airfoil 310a and the second rotating airfoil 310b form a pair of rotating airfoils 310. The conduit 334 of the first rotating airfoil 310a is fluidly connected to the conduit 334 of the second rotating airfoil 310b, and, in this embodiment, directly fluidly connected to each other forming a single flow passage 336 between the opening 332 on the first rotating airfoil 310a and the opening 332 on the second rotating airfoil 310b. When each rotating airfoil 310 includes a plurality of openings 332, each of the plurality of openings 332 may be connected to a corresponding conduit 334 (see FIG. 7), and each conduit 334 on the first rotating airfoil 310a may fluidly connect to a corresponding conduit 334 and, thus, a corresponding opening 332 on the second rotating airfoil 310b. In such an embodiment, a plurality of flow passages 336 are formed between the first rotating airfoil 310a and the second rotating airfoil 310b. In other embodiments, the plurality of openings 332 may connect to a single conduit 334.

A pressure differential also occurs between the opening 332 on the first rotating airfoil 310a and the opening 332 on the second rotating airfoil 310b in the non-axial flow condition. In the embodiment depicted in FIG. 10, with the openings 332 formed on the suction surface 326, the pressure differential is inversely proportional to the lift differential. This change in pressure is schematically illustrated by the smaller of the broken lines in FIG. 10. This pressure differential between the first rotating airfoil 310a and the opening 332 on the second rotating airfoil 310b drives a flow of air through the flow passage 336 from the opening 332 on the second rotating airfoil 310b to the opening 332 on the first rotating airfoil 310a such that air is ejected from the opening 332 on the rotating airfoil 310 to disrupt the airflow across the suction surface 326 and to reduce the lift produced by the first rotating airfoil 310a. Because this airflow is driven by the differential pressures, the embodiment depicted in FIG. 10 passively adjusts to different angles of the rotation axis 301, and provides for increasing and decreasing the amount of air ejected from the opening 332 as the rotating airfoil 310 travels from the bottom (one hundred eighty degrees) to the top (zero degrees).

Figure 11:
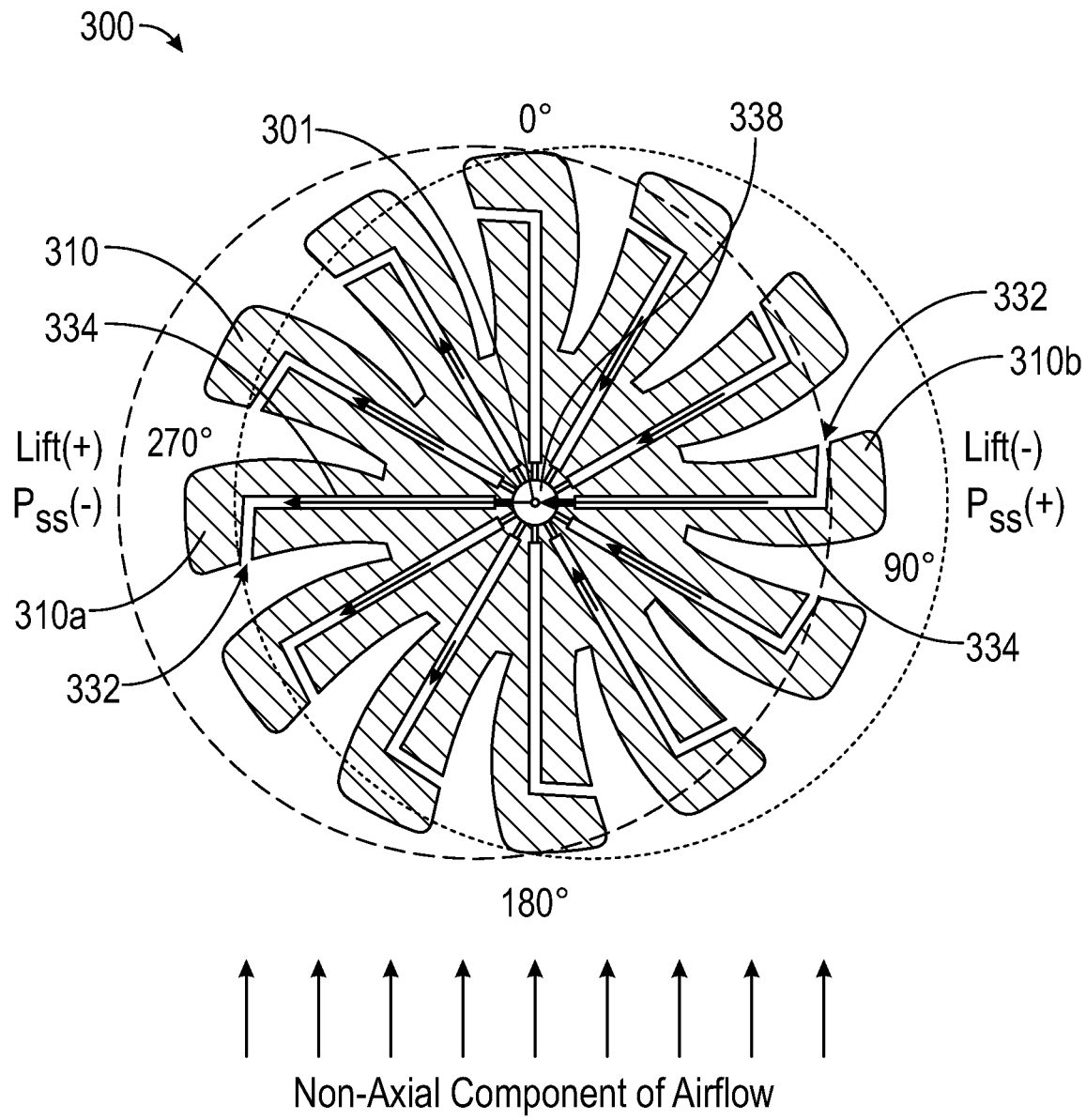
FIG. 11 is a schematic, cross-sectional view, taken along line 10-10 in FIG. 2, showing another embodiment of the fan (rotating airfoil assembly) of the unducted single fan engines of the aircraft shown in FIG. 2.

FIG. 11 shows a rotating airfoil assembly 300 including the rotating airfoil 310 according to another embodiment. As in the arrangement shown in FIG. 10, FIG. 11 illustrates a condition where the rotation axis 301 is angled (such as pitched upward or downward) relative to the flow of air into the rotating airfoil 310. The rotating airfoil assembly 300 shown in FIG. 11 is the same as the rotating airfoil assembly 300 shown in FIG. 10, but, instead of the conduit 334 of the first rotating airfoil 310a and the conduit 334 of the second rotating airfoil 310b forming a single flow passage 336, each conduit 334 is fluidly coupled to a central manifold 338. The rotating airfoil assembly 300 shown in FIG. 11 may operate in a substantially similar manner as the rotating airfoil assembly 300 shown in FIG. 10.

Figure 12:
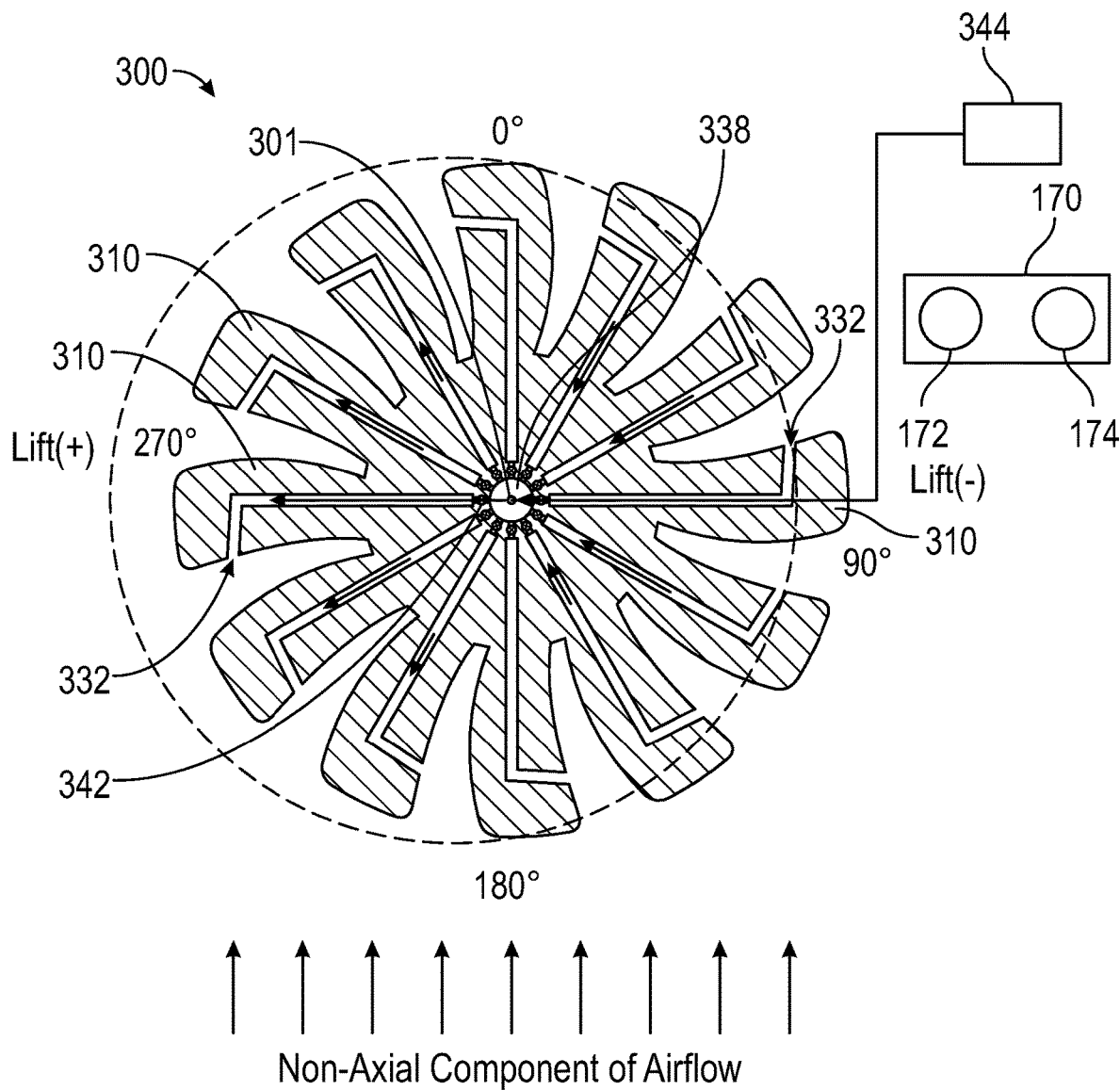
FIG. 12 is a schematic, cross-sectional view, taken along line 10-10 in FIG. 2, showing a further embodiment of the fan (rotating airfoil assembly) of the unducted single fan engines of the aircraft shown in FIG. 2.

FIG. 12 shows a rotating airfoil assembly 300 including the rotating airfoil 310 according to a further embodiment. As in the arrangement shown in FIGS. 10 and 11, FIG. 12 illustrates a condition where the rotation axis 301 is angled (such as pitched upward or downward) relative to the flow of air into the rotating airfoil 310. In the embodiments depicted in FIGS. 10 and 11, the ejection of air (including the amount of air ejected) from the opening 332 is passively controlled by differential pressure. The ejection of air from the opening 332 may be actively controlled. In the embodiment shown in FIG. 12, each of the conduits 334 is fluidly connected to the central manifold 338 with a flow control valve 342 positioned between the central manifold 338 and the opening 332. Air is provided to the central manifold 338 from an air source 344. Suitable air sources 344 include, for example, an engine source, such as compressor cooling from the compressor cooling air (CCA) system 154 (FIG. 2). The flow control valve 342 is configured to selectively control the flow of air from the central manifold 338 to the opening 332 to disrupt the flow of air across the suction surface 326 or the pressure surface 328 in the manner discussed above.

In this embodiment, the flow control valve 342 may be operated by a controller, such as an engine controller 170 (see also FIG. 2). Other suitable controllers may be used including, for example, a dedicated controller or a controller that is part of the flight control system for the aircraft 10 (flight controller). In this embodiment, the controller 170 is a computing device having one or more processors 172 and one or more memories 174. The processor 172 can be any suitable processing device, including, but not limited to, a microprocessor, a microcontroller, an integrated circuit, a logic device, a programmable logic controller (PLC), an application specific integrated circuit (ASIC), and/or a Field Programmable Gate Array (FPGA). The memory 174 can include one or more computer-readable media, including, but not limited to, non-transitory computer-readable media, a computer readable non-volatile medium (e.g., a flash memory), a RAM, a ROM, hard drives, flash drives, and/or other memory devices.

The memory 174 can store information accessible by the processor 172, including computer-readable instructions that can be executed by the processor 172. The instructions can be any set of instructions or a sequence of instructions that, when executed by the processor 172, cause the processor 172 and the controller 170 to perform operations. In some embodiments, the instructions can be executed by the processor 172 to cause the processor 172 to complete any of the operations and functions for which the controller 170 is configured, as will be described further below. The instructions can be software written in any suitable programming language or can be implemented in hardware. Additionally, and/or alternatively, the instructions can be executed in logically and/or virtually separate threads on the processor 172. The memory 174 can further store data that can be accessed by the processor 172.

The technology discussed herein makes reference to computer-based systems and actions taken by, and information sent to and from, computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

The controller 170 is operatively and communicatively coupled to each of the flow control valves 342 and configured to selectively control the flow of air from the central manifold 338 to the opening 332 by, for example, operating each flow control valve 342 to provide a desired amount of air from the central manifold 338 to each opening 332. The controller 170 may also be operatively and communicatively coupled to a suitable device, such as a pump or other valve, to provide air at a desired pressure from the air source 344 to the central manifold 338. The controller 170 is configured to receive an indication (or signal) that the rotation axis 301 of the rotating airfoil 310 is angled upwardly or downwardly and, upon receipt of that signal, selectively control the flow of air from the central manifold 338 to the opening 332. The indication may be received from a sensor configured to detect the pitch of the aircraft, for example, either directly from the sensor or from another source such as the flight controller.

Each of FIGS. 10 to 12 depicts a condition in which there is an upward component of non-axial flow into the rotating airfoil 310, such as when the rotation axis 301 is angled upward during takeoff or climb for the aircraft 10. The asymmetric loading condition is reversed when there is a downward component of non-axial flow into the rotating airfoil 310, such as when the rotation axis 301 is angled downward during descent the aircraft 10. The selective ejection of air from each opening 332 is, thus, reversed from the conditions discussed above when the rotation axis 301 is angled downward.

Further aspects of the present disclosure are provided by the subject matter of the following clauses.

A rotating airfoil assembly including a rotation axis and a plurality of rotating airfoils configured to rotate about the rotation axis. Each rotating airfoil of the rotating airfoils includes a leading edge, a trailing edge, a suction surface between the leading edge and the trailing edge, and a pressure surface between the leading edge and the trailing edge. The suction surface and the pressure surface are positioned on opposite sides of the rotating airfoil such that, when airflows over the suction surface and the pressure surface of the rotating airfoil as the rotating airfoil rotates about the rotation axis, the rotating airfoil generates lift. At least one opening is on one of the suction surface or the pressure surface. The at least one opening is configured to eject air or to draw air into the opening.

The rotating airfoil assembly of the preceding clause, including a plurality of openings on one of the suction surface or the pressure surface. Each opening of the plurality of openings is configured to eject air or draw air into the opening.

The rotating airfoil assembly of any of the preceding clauses, where the at least one opening is closer to the leading edge than the trailing edge.

The rotating airfoil assembly of any of the preceding clauses, where each rotating airfoil of the rotating airfoils includes a root and a tip. The at least one opening is closer to the tip than the root.

The rotating airfoil assembly of any of the preceding clauses, where the opening includes edges and the edges define a plane of the opening. The opening is configured to eject air outward from the one of the suction surface or the pressure surface in a direction that is normal to the plane of the opening.

The rotating airfoil assembly of any of the preceding clauses, where the opening is configured to eject air outward from the one of the suction surface or the pressure surface in a direction that is both outward and in a direction toward the leading edge.

The rotating airfoil assembly of any of the preceding clauses, where the opening is configured to eject air outward from the one of the suction surface or the pressure surface in a direction that is both outward and in a direction toward the trailing edge.

The rotating airfoil assembly of any of the preceding clauses, where the at least one opening is located on the suction surface. The opening is configured to selectively eject air to disrupt air flowing over the suction surface when the rotating airfoil is rotating in an upward direction and when the rotation axis is angled upward relative to airflow flowing into the rotating airfoil assembly.

The rotating airfoil assembly of any of the preceding clauses, where one rotating airfoil of the plurality of rotating airfoils is a first rotating airfoil and another rotating airfoil of the plurality of rotating airfoils is a second rotating airfoil. The opening of the first rotating airfoil and the opening of the second rotating airfoil are fluidly connected to each other by a conduit.

The rotating airfoil assembly of any of the preceding clauses, where the first rotating airfoil is positioned opposite to the second rotating airfoil with the rotation axis therebetween.

The rotating airfoil assembly of any of the preceding clauses, where the at least one opening of each of the first rotating airfoil and the opening of the second rotating airfoil is located on the respective suction surface. Air (a) is drawn into the opening of the second rotating airfoil, (b) travels from the opening of the second rotating airfoil through the conduit to the opening of the first rotating airfoil, and (c) is ejected from the opening of the first rotating airfoil disrupting air flowing over the suction surface of the first rotating airfoil when (i) the first rotating airfoil is rotating in an upward direction, (ii) the second rotating airfoil is rotating in a downward direction, and (iii) the rotation axis is angled upward relative to airflow flowing into the rotating airfoil assembly.

The rotating airfoil assembly of any of the preceding clauses, further including a manifold. The opening of each of the rotating airfoils is fluidly connected to the manifold.

The rotating airfoil assembly of any of the preceding clauses, further including an air source fluidly coupled to the manifold and configured to supply the manifold with air.

The rotating airfoil assembly of any of the preceding clauses, where the opening of each of the rotating airfoils is fluidly connected to the manifold by a conduit. A flow control valve is located in the conduit and configured to control the flow of air from the manifold to the opening.

The rotating airfoil assembly of any of the preceding clauses, further including a controller operatively coupled to each flow control valve and configured to selectively operate each flow control valve to provide a desired amount of air from the manifold to each opening.

The rotating airfoil assembly of any of the preceding clauses, where the at least one opening is located on the suction surface, and where the controller is configured (i) to receive an indication that the rotation axis of the rotating airfoil assembly is angled one of upward or downward relative to the direction of airflow into the rotating airfoil assembly, (ii) to operate the flow control valves to supply air to the openings in each rotating airfoil that is rotating in an upward direction in response to an indication that the rotation axis of the rotating airfoil assembly is angled upward, and (iii) to operate the flow control valves to supply air to the openings in each rotating airfoil that is rotating in a downward direction in response to an indication that the rotation axis of the rotating airfoil assembly is angled downward.

An engine including, the rotating airfoil assembly of any of the preceding clauses, and a torque producing system coupled to the rotating airfoil assembly and configured to rotate the rotating airfoil assembly about the rotation axis of the rotating airfoil assembly.

The engine of any of the preceding clauses, where the engine is an unducted single fan engine, the torque producing system is a turbomachine of a gas turbine engine, and the rotating airfoil assembly is a fan with each of the plurality of rotating airfoils being fan blades.

The engine of any of the preceding clauses, where the engine is a turboprop engine, the torque producing system is a turbomachine of a gas turbine engine, the rotating airfoil assembly is a propeller assembly with each of the plurality of rotating airfoils being a propeller.

The engine of any of the preceding clauses, further including, a manifold, and air source, and a controller. The opening of each of the rotating airfoils is fluidly connected to the manifold. The air source is fluidly coupled to the manifold and configured to supply the manifold with air. The air source is an engine air source from the torque producing system. The controller is operatively coupled to each flow control valve and configured to selectively operate each flow control valve to provide a desired amount of air from the manifold to each opening.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. A rotating airfoil assembly comprising:
a rotation axis; and
a plurality of rotating airfoils connected to each other to rotate about the rotation axis, the plurality of rotating airfoils including a first rotating airfoil and a second rotating airfoil, each rotating airfoil of the plurality of rotating airfoils including:
a leading edge;
a trailing edge;
a suction surface between the leading edge and the trailing edge;
a pressure surface between the leading edge and the trailing edge, the pressure surface being positioned on an opposite side of the rotating airfoil from the suction surface such that, when air flows over the suction surface and the pressure surface of the rotating airfoil as the rotating airfoil rotates about the rotation axis, the rotating airfoil generates lift;
at least one opening on the suction surface, the at least one opening being configured to eject air or to draw in air; and
a conduit formed in the rotating airfoil and fluidly connected to the at least one opening,
wherein the conduit of the first rotating airfoil is fluidly connected to the conduit of the second rotating airfoil to fluidly connect the at least one opening of the first rotating airfoil with the at least one opening of the second rotating airfoil, and
wherein, when (i) the first rotating airfoil is rotating in an upward direction, (ii) the second rotating airfoil is rotating in a downward direction, and (iii) the rotation axis is angled upward relative to an airflow flowing into the rotating airfoil assembly, air (a) is drawn into the at least one opening of the second rotating airfoil, (b) travels from the at least one opening of the second rotating airfoil through the conduits of the first rotating airfoil and the second rotating airfoil to the at least one opening of the first rotating airfoil, and (c) is ejected from the at least one opening of the first rotating airfoil thereby disrupting air flowing over the suction surface of the first rotating airfoil.

2. The rotating airfoil assembly of claim 1, wherein each rotating airfoil includes a plurality of the at least one opening on the suction surface, each opening of the plurality of openings being configured to eject air or draw in air.

3. The rotating airfoil assembly of claim 1, wherein the at least one opening is closer to the leading edge than the trailing edge.

4. The rotating airfoil assembly of claim 1, wherein each rotating airfoil of the rotating airfoils includes: a root and a tip, the at least one opening being closer to the tip than the root.

5. The rotating airfoil assembly of claim 1, wherein, for each rotating airfoil, the at least one opening includes edges and the edges define a plane of the respective opening, each opening being configured to eject air outward from the suction surface in a direction that is normal to the plane of the respective opening.

6. The rotating airfoil assembly of claim 1, wherein, for each rotating airfoil, the at least one opening is configured to eject air outward from the suction surface in a direction that is both outward and in a direction toward the leading edge.

7. The rotating airfoil assembly of claim 1, wherein, for each rotating airfoil, the at least one opening is configured to eject air outward from the suction surface in a direction that is both outward and in a direction toward the trailing edge.

8. The rotating airfoil assembly of claim 1, wherein the conduit of the first rotating airfoil is directly fluidly connected to the conduit of the second rotating airfoil thereby forming a single flow passage between the at least one opening on the first rotating airfoil and the at least one opening on the second rotating airfoil.

9. The rotating airfoil assembly of claim 1, further comprising a manifold, the conduit of each of the rotating airfoils being fluidly connected to the manifold.

10. The rotating airfoil assembly of claim 1, wherein the first rotating airfoil is positioned opposite to the second rotating airfoil.

11. The rotating airfoil assembly of claim 10, wherein the first rotating airfoil and the second rotating airfoil are one hundred eighty degrees apart from each other such that the first rotating airfoil is positioned directly opposite to the second rotating airfoil.

12. An engine comprising:
the rotating airfoil assembly of claim 1; and
a torque producing system coupled to the rotating airfoil assembly to rotate the rotating airfoil assembly about the rotation axis of the rotating airfoil assembly.

13. The engine of claim 12, wherein the engine is an unducted single fan engine, the torque producing system being a turbomachine of a gas turbine engine, the rotating airfoil assembly being a fan with each of the plurality of rotating airfoils being fan blades.

14. The engine of claim 12, wherein the engine is a turboprop engine, the torque producing system being a turbomachine of a gas turbine engine, the rotating airfoil assembly being a propeller assembly with each of the plurality of rotating airfoils being a propeller.

15. A rotating airfoil assembly comprising:
a rotation axis;
a plurality of rotating airfoils connected to each other to rotate about the rotation axis, each rotating airfoil of the plurality of rotating airfoils including:
(i) a leading edge;
(ii) a trailing edge;

(iii) a suction surface between the leading edge and the trailing edge;
(iv) a pressure surface between the leading edge and the trailing edge, the pressure surface being positioned on an opposite side of the rotating airfoil from the suction surface such that, when air flows over the suction surface and the pressure surface of the rotating airfoil as the rotating airfoil rotates about the rotation axis, the rotating airfoil generates lift;
(v) at least one opening on one of the suction surface or the pressure surface, the at least one opening being configured to eject air; and
(vi) a conduit formed in the rotating airfoil and fluidly connected to the at least one opening; and
a manifold, the conduit of each of the rotating airfoils being fluidly connected to the manifold;
an air source fluidly coupled to the manifold and configured to supply the manifold with air; and
a flow control assembly positioned to control the flow of air from the manifold into the conduit of each rotating airfoil and selectively eject air from the at least one opening as each airfoil rotates about the rotation axis,
wherein the flow control assembly includes a plurality of flow control valves, a flow control valve of the plurality of the flow control valves being located in the conduit of each of the rotating airfoils to control the flow of air from the manifold to the at least one opening.

16. The rotating airfoil assembly of claim 15, further comprising a controller operatively coupled to each flow control valve and configured to selectively operate each flow control valve to provide a desired amount of air from the manifold to each opening.

17. The rotating airfoil assembly of claim 16, wherein the at least one opening is located on the suction surface, and wherein the controller is configured (i) to receive an indication that the rotation axis of the rotating airfoil assembly is angled one of upward or downward relative to the direction of an airflow into the rotating airfoil assembly, (ii) to operate the flow control valves to supply air to the at least one opening in each rotating airfoil that is rotating in an upward direction in response to an indication that the rotation axis of the rotating airfoil assembly is angled upward, and (iii) to operate the flow control valves to supply air to the at least one opening in each rotating airfoil that is rotating in a downward direction in response to an indication that the rotation axis of the rotating airfoil assembly is angled downward.

18. An engine comprising:
the rotating airfoil assembly of claim 15; and
a torque producing system coupled to the rotating airfoil assembly to rotate the rotating airfoil assembly about the rotation axis of the rotating airfoil assembly, wherein the air source is an engine air source from the torque producing system.

19. The engine of claim 18, wherein the torque producing system is a turbomachine of a gas turbine engine having a compressor, and the air source is air from the compressor.

* * * * *